United States Patent
McClelland et al.

(10) Patent No.: US 12,242,279 B2
(45) Date of Patent: Mar. 4, 2025

(54) VEHICLE TO VEHICLE (V2V) RETURN TO LAST FILL POINT

(71) Applicant: CNH Industrial America LLC, New Holland, PA (US)

(72) Inventors: Brett McClelland, Chicago, IL (US); Peter Henne, Morris, IL (US)

(73) Assignees: CNH Industrial America LLC, New Holland, PA (US); CNH Industrial Italia S.p.A., Turin (IT)

( * ) Notice: Subject to any disclaimer, the term of this patent is extended or adjusted under 35 U.S.C. 154(b) by 371 days.

(21) Appl. No.: 17/125,479

(22) Filed: Dec. 17, 2020

(65) Prior Publication Data

US 2022/0197302 A1 Jun. 23, 2022

(51) Int. Cl.
*G05D 1/00* (2024.01)
*A01D 90/02* (2006.01)
(Continued)

(52) U.S. Cl.
CPC ........... *G05D 1/0287* (2013.01); *A01D 90/02* (2013.01); *A01D 90/10* (2013.01); *G01S 19/51* (2013.01);
(Continued)

(58) Field of Classification Search
CPC .. G05D 1/0287; G05D 1/0088; G05D 1/0212; G05D 2201/0201; G05D 1/0278;
(Continued)

(56) References Cited

U.S. PATENT DOCUMENTS 6,205,381 B1 * 3/2001 Motz ................... A01B 69/008
701/25
6,216,071 B1 * 4/2001 Motz ................. A01D 41/1275
701/50
(Continued)

FOREIGN PATENT DOCUMENTS

EP 1219153 A2 * 7/2002 ........... A01B 69/008
WO WO-2017/205410 11/2017
WO WO-2017205417 A1 * 11/2017 ............. A01D 90/10

OTHER PUBLICATIONS

Thomasson, J. Alex, et al. "A review of the state of the art in agricultural automation. Part II: On-farm agricultural communications and connectivity." 2018 ASABE Annual International Meeting. American Society of Agricultural and Biological Engineers, 2018. (Year: 2018).*

*Primary Examiner* — Ramon A. Mercado
*Assistant Examiner* — Ellis B. Ramirez
(74) *Attorney, Agent, or Firm* — Rickard K. DeMille; Rebecca L. Henkel; Peter K. Zacharias (57) ABSTRACT

A vehicle control system for an agricultural vehicle comprising a processing circuit including a processor and memory, the memory having instructions stored thereon that, when executed by the processor, cause the processing circuit to receive position information associated with a position of at least one of a second agricultural vehicle or a vehicular implement, determine, based on the position information, an unloading point associated with a position of an unloading mechanism relative to a receiving container, store the determined position, operate at least one of the agricultural vehicle or the second agricultural vehicle to position the receiving container such that a subsequent unloading point is the same as the determined unloading point.

20 Claims, 4 Drawing Sheets

(51) Int. Cl.
  *A01D 90/10* (2006.01)
  *G01S 19/51* (2010.01)

(52) U.S. Cl.
  CPC ......... *G05D 1/0088* (2013.01); *G05D 1/0212* (2013.01)

(58) Field of Classification Search
  CPC ...... G05D 1/0293; A01D 90/02; A01D 90/10; A01D 41/1278; G01S 19/51
  USPC .......... 701/23, 59, 116, 32.4, 408, 412, 485; 56/10.2 R
  See application file for complete search history.

(56) References Cited

U.S. PATENT DOCUMENTS

| | | | |
|---|---|---|---|
| 8,126,620 B2 | 2/2012 | Ringwald et al. | |
| 8,145,393 B2 | 3/2012 | Foster et al. | |
| 9,014,901 B2 | 4/2015 | Wang et al. | |
| 9,301,447 B2 | 4/2016 | Kormann | |
| 10,028,442 B1* | 7/2018 | Crosby | B60P 3/00 |
| 2010/0274452 A1* | 10/2010 | Ringwald | A01B 69/008 |
| | | | 701/50 |
| 2010/0332051 A1 | 12/2010 | Kormann | |
| 2012/0215394 A1* | 8/2012 | Wang | A01D 41/1278 |
| | | | 701/50 |
| 2012/0063560 A1 | 10/2012 | Diekhans et al. | |
| 2013/0022430 A1* | 1/2013 | Anderson | B65G 67/22 |
| 2013/0166157 A1* | 6/2013 | Schleicher | G05D 1/0295 |
| | | | 701/50 |
| 2013/0211675 A1* | 8/2013 | Bonefas | B62D 12/02 |
| | | | 701/41 |
| 2014/0083556 A1* | 3/2014 | Darr | A01D 43/087 |
| 2014/0121882 A1 | 5/2014 | Gilmore et al. | |
| 2014/0325422 A1* | 10/2014 | Madsen | G06F 3/0488 |
| 2017/0042089 A1* | 2/2017 | Bonefas | H04N 13/204 |
| 2017/0042090 A1* | 2/2017 | Bonefas | G05D 1/0246 |
| 2020/0128739 A1 | 4/2020 | Suleman | |
| 2020/0196526 A1 | 6/2020 | Koch et al. | |

\* cited by examiner

VEHICLE TO VEHICLE (V2V) RETURN TO LAST FILL POINT

BACKGROUND

The present disclosure relates generally to the field of vehicle operation, and more particularly to a system and method for determining a fill point and positioning a vehicle.

SUMMARY

One embodiment of the present disclosure is a vehicle control system for an agricultural vehicle comprising a processing circuit including a processor and memory, the memory having instructions stored thereon that, when executed by the processor, cause the processing circuit to receive position information associated with a position of at least one of a second agricultural vehicle or a vehicular implement, determine, based on the position information, an unloading point associated with a position of an unloading mechanism relative to a receiving container, store the determined position, operate at least one of the agricultural vehicle or the second agricultural vehicle to position the receiving container such that a subsequent unloading point is the same as the determined unloading point.

In some embodiments, the position information includes global positioning system (GPS) data. In some embodiments, the position information includes relative position information describing a position of at least one of the second agricultural vehicle or the vehicular implement relative to the agricultural vehicle. In some embodiments, the processing circuit is further configured to share the determined position with an external system. In some embodiments, operating at least one of the agricultural vehicle or the second agricultural vehicle includes positioning a grain cart relative to the unloading mechanism autonomously without user input. In some embodiments, the determined position is used to calculate a fill characteristic of the receiving container. In some embodiments, the vehicular implement includes a grain cart.

Another embodiment of the present disclosure is a method of positioning a receiving container including receiving position information associated with a position of at least one of a second agricultural vehicle or a vehicular implement, determining, based on the position information, an unloading point associated with a position of an unloading mechanism relative to a receiving container, storing the determined position, and operating at least one of a first agricultural vehicle or the second agricultural vehicle to position the receiving container such that a subsequent unloading point is the same as the determined unloading point.

In some embodiments, the position information includes global positioning system (GPS) data. In some embodiments, the position information includes relative position information describing a position of at least one of the second agricultural vehicle or the vehicular implement relative to the first agricultural vehicle. In some embodiments, the method further comprises sharing the determined position with an external system. In some embodiments, operating at least one of the agricultural vehicle or the second agricultural vehicle includes positioning a grain cart relative to the unloading mechanism autonomously without user input. In some embodiments, the determined position is used to calculate a fill characteristic of the receiving container. In some embodiments, the vehicular implement includes a grain cart.

Another embodiment of the present disclosure is a non-transitory computer-readable storage medium having instructions stored thereon that, when executed by a processor, cause the processor to receive position information associated with a position of at least one of a second agricultural vehicle or a vehicular implement, determine, based on the position information, an unloading point associated with a position of an unloading mechanism relative to a receiving container, store the determined position, and operate at least one of a first agricultural vehicle or the second agricultural vehicle to position the receiving container such that a subsequent unloading point is the same as the determined unloading point.

In some embodiments, the position information includes global positioning system (GPS) data. In some embodiments, the position information includes relative position information describing a position of at least one of the second agricultural vehicle or the vehicular implement relative to the first agricultural vehicle. In some embodiments, the processor is further configured to share the determined position with an external system. In some embodiments, the determined position is used to calculate a fill characteristic of the receiving container. In some embodiments, the vehicular implement includes a grain cart.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Referring generally to the FIGURES, described herein are systems and methods of a vehicle control system. In various embodiments, the vehicle control system determines a fill position. For example, the vehicle control system may determine where to position an unloading auger relative to a grain cart to prevent overfill (e.g., spillage, etc.). In various embodiments, the vehicle control system receives input from one or more sources. For example, the vehicle control system may receive geospatial data (e.g., GPS coordinates, etc.) from other vehicles. As another example, the vehicle control system may receive relative positioning information associated with a relative position of a vehicle with respect to another element such as a different vehicle, a trailer (e.g., a grain cart, etc.), or a vehicular implement. In various embodiments, the vehicle control system controls the operation of a vehicle to achieve a particular fill position. For example, the vehicle control system may operate a hauling vehicle to position an unloading auger of a harvesting vehicle in a particular location relative to a grain cart towed by the hauling vehicle. In various embodiments, the vehicle control system dynamically operates a vehicle. For example, the vehicle control system may dynamically control a hauling vehicle to maintain a position of an unloading auger relative to a grain cart towed by the hauling vehicle while the hauling vehicle tracks alongside a harvesting vehicle in operation. As another example, the vehicle control system may dynamically control a hauling vehicle to evenly distribute grain fill throughout a grain cart (e.g., by moving the fill point as needed, etc.) towed by the hauling vehicle while the hauling vehicle tracks alongside a harvesting vehicle in operation. Additionally or alternatively, the vehicle control system may determine a fill position, at least partially operate a vehicle to achieve the fill position, and then transfer control of the vehicle to a user.

In various embodiments, the vehicle control system stores a last used fill position. For example, a hauling vehicle towing a grain cart may unload a harvesting vehicle and may store a position of an unloading auger of the harvesting vehicle relative to the grain cart when the unloading process is completed. To continue the example, when the hauling vehicle returns to continue unloading the harvesting vehicle, the vehicle control system may position the hauling vehicle such that the unloading auger of the harvesting vehicle begins unloading the harvesting vehicle from the same point relative to the grain cart that the unloading process previously completed at. It should be understood that the vehicle control system may operate any vehicle, trailer, and/or implement to achieve the desired fill position. For example, the vehicle control system may position a hauling vehicle relative to a harvesting vehicle, may position a grain cart relative to an unloading auger (e.g., of a harvesting vehicle, of another grain cart, of a grain bin, etc.), may position a harvesting vehicle relative to a grain cart, may position an unloading auger relative to a hauling vehicle, may position a harvesting vehicle and a hauling vehicle relative to an arbitrary point, and/or the like. In various embodiments, the vehicle control system of the present disclosure facilitates partial and/or complete automation of a vehicle.

Figure 1:
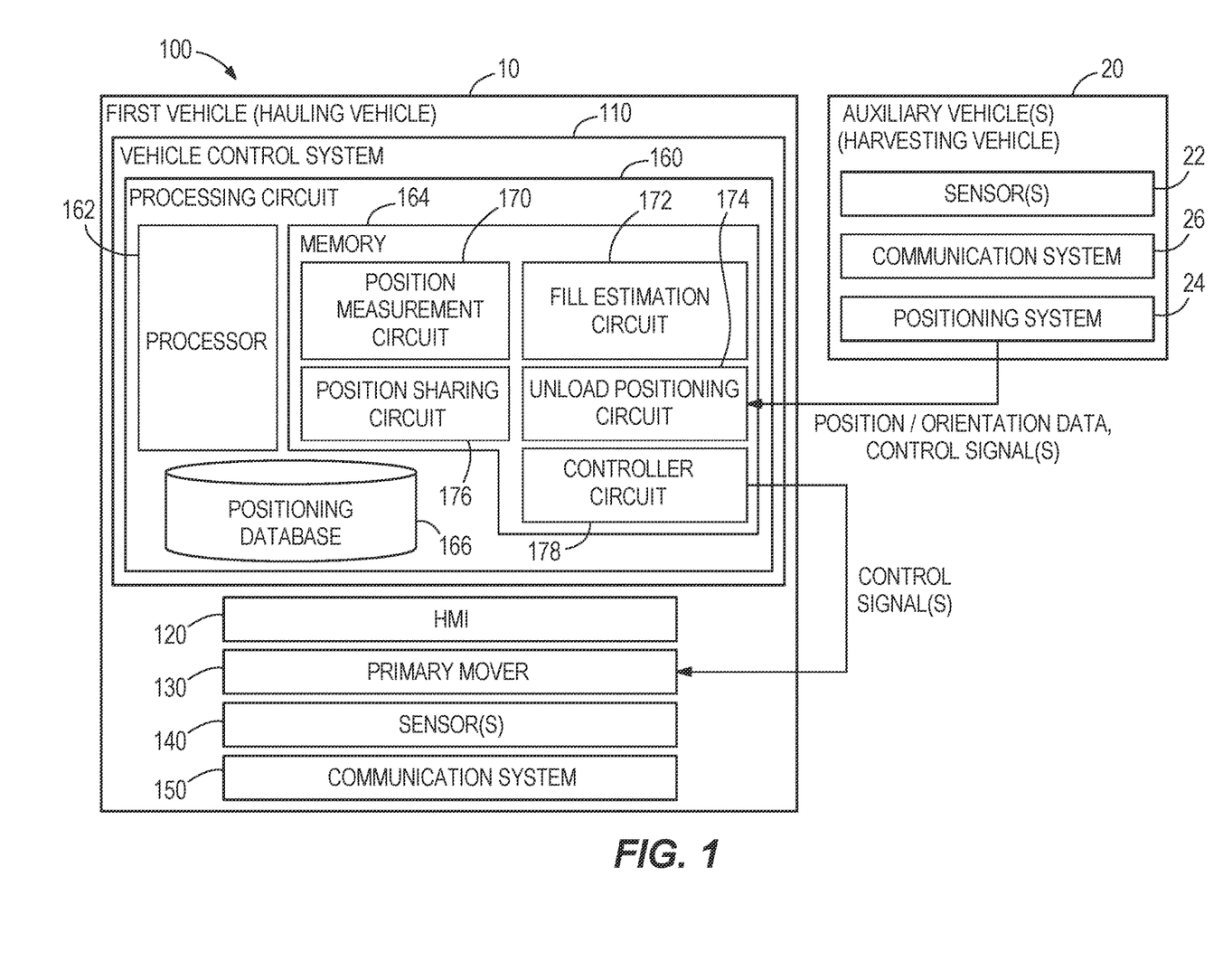
FIG. 1 is a block diagram of a vehicle having a vehicle control system, according to an exemplary embodiment.

Hereinafter, example embodiments will be described in more detail with reference to the accompanying drawings. Referring now to FIG. 1, a block diagram of a control environment 100 is shown, according to an exemplary embodiment. Control environment 100 is shown to include first vehicle (hauling vehicle) 10 and auxiliary vehicle(s) (harvesting vehicle) 20. In various embodiments, hauling vehicle 10 and harvesting vehicle 20 are agricultural vehicles. For example, hauling vehicle 10 may be or include a hauling vehicle (e.g., a tractor-trailer, etc.) and harvesting vehicle 20 may be or include harvesting vehicles (e.g., a combine harvester, etc.). In some embodiments, each of harvesting vehicles 20 are the same or a similar type of vehicle (e.g., a number of combine harvesters, etc.). Additionally or alternatively, harvesting vehicle 20 may be or include a number of different types of vehicles. For example, harvesting vehicle 20 may include a first utility vehicle (e.g., a truck such as a Class 1 light pickup truck, etc.), a second and third hauling vehicle, and a fourth irrigation vehicle (e.g., a linear move irrigation system, etc.). In various embodiments, hauling vehicle 10 is associated with one or more of harvesting vehicles 20. For example, a first harvesting vehicle 20 may be a leader vehicle and hauling vehicle 10 may be a follower vehicle configured to communicate with the first harvesting vehicle 20 via a vehicular communication system. While the vehicle control system of the present disclosure is described in relation to agricultural vehicles, it should be understood that the vehicle control system is usable with other vehicles (e.g., non-agricultural vehicles) and that such embodiments are within the scope of the present disclosure. As a non-limiting example, in a landscaping context, hauling vehicle 10 may be a wagon and harvesting vehicle 20 may be a lawn mower. As another non-limiting example, in a snow-clearing context, hauling vehicle 10 may be a dump truck and harvesting vehicle 20 may be a winter service vehicle including a snow blower. As another non-limiting example, in a construction context, hauling vehicle 10 may be a dump truck and harvesting vehicle 20 may include an excavation vehicle such as a bulldozer, loader (e.g., front loader, backhoe loader, track loader, etc.), power shovel, front shovel, and/or the like. In various embodiments, harvesting vehicle 20 may be one of various other construction related vehicles. For example, a first hauling vehicle 10 may be a dump truck and a first harvesting vehicle 20 may be a paving machine (e.g., an asphalt paver, etc.), where the dump truck is configured to determine an optimal route to supply the paving machine with paving materials (e.g., if the paving machine requires the dump truck to be in a specific location to receive the paving materials, etc.). In various embodiments, construction vehicles may be equipped with vehicle control system 110 to facilitate determining a fill position and/or vehicular control. For example, numerous hauling vehicles 10 (e.g., dump trucks, etc.) may be configured to share data to facilitate accurate alignment (e.g., positioning, etc.) with another vehicle.

Hauling vehicle 10 includes vehicle control system 110, human-machine interface (HMI) 120, primary mover 130, sensor(s) 140, and communication system 150. Vehicle control system 110 may determine a previous fill position and perform vehicular operation as described herein. In various embodiments, vehicle control system 110 is physically located with hauling vehicle 10. For example, vehicle control system 110 may be or include a hardware component installed in hauling vehicle 10. Additionally or alternatively, part or all of vehicle control system 110 may be located separately of hauling vehicle 10. For example, vehicle control system 110 may be or include a remote processing system (e.g., a server, two or more computing systems/servers in a distributed computing implementation, a cloud-based processing system, etc.) configured to receive input from control environment 100 and control hauling vehicle 10 remotely.

HMI 120 may facilitate user interaction with hauling vehicle 10 and/or vehicle control system 110. HMI 120 may include elements configured to present information to a user and receive user input. For example, HMI 120 may include a display device (e.g., a graphical display, a touchscreen, etc.), an audio device (e.g., a speaker, etc.), manual controls (e.g., manual steering control, manual transmission control, manual braking control, etc.), and/or the like. HMI 120 may include hardware and/or software components. For example, HMI 120 may include a microphone configured to receive user voice input and a software component configured to control hauling vehicle 10 based on the received user voice input. In various embodiments, HMI 120 presents information associated with the operation of hauling vehicle 10 and/or vehicle control system 110 to a user and facilitates user control of operating parameters. For example, HMI 120 may display operational parameters (e.g., fuel level, seed level, penetration depth of ground engaging tools, guidance swath, etc.) on a touchscreen display and receive user control input via the touchscreen display.

Primary mover 130 may generate mechanical energy to operate hauling vehicle 10. For example, primary mover 130 may be or include an internal combustion engine. Additionally or alternatively, primary mover 130 may be or include an electric motor. In various embodiments, primary mover 130 is coupled to a frame of hauling vehicle 10 and configured to provide power to a plurality of tractive elements (e.g. wheels, etc.). In various embodiments, primary mover 130 utilizes one or more fuels and/or energy storage systems (e.g., rechargeable batteries, etc.). For example, primary mover 130 may utilize diesel, gasoline, propane, natural gas, hydrogen, lithium-ion batteries, nickel-metal hydride batteries, lithium-ion polymer batteries, lead-acid batteries, nickel-cadmium batteries, and/or the like.

Sensor(s) 140 may monitor one or more parameters associated with hauling vehicle 10. For example, sensor(s) 140 may monitor operation of primary mover 130 (e.g., torque, temperature, fuel level, airflow, etc.). Additionally or alternatively, sensor(s) 140 may monitor an environment of hauling vehicle 10. For example, sensor(s) 140 may include cameras to view the surroundings of hauling vehicle 10 and perform object recognition to facilitate obstacle avoidance. Sensor(s) 140 may include engine sensors, positioning sensors, transmission sensors, chassis sensors, safety sensors, driver assistance sensors, passenger comfort sensors, entertainment systems sensors, and/or the like. In various embodiments, sensor(s) 140 monitor geospatial parameters associated with hauling vehicle 10. For example, sensor(s) 140 may include a geolocation sensor (e.g., a GPS receiver, satellite navigation transceiver, etc.) configured to monitor a position of hauling vehicle 10 (e.g., provide geolocation and/or time information, etc.). In various embodiments, sensor(s) 140 measure a relative position of hauling vehicle 10. For example, sensor(s) 140 may measure a position of hauling vehicle 10 relative to an unloading auger, another vehicle (e.g., such as harvesting vehicle 20, etc.), or an arbitrary point. Sensor(s) 140 may measure an absolute position of hauling vehicle 10 (e.g., a location, etc.), a relative position of hauling vehicle 10 (e.g., a displacement, a linear travel, a rotational angle, etc.), and/or a three-dimensional position of hauling vehicle 10. In some embodiments, sensor(s) 140 receive input from external sources. For example, sensor(s) 140 may include position sensors configured to communicate with one or more beacons located throughout a farm field to determine a location of hauling vehicle 10. As another example, sensor(s) 140 may receive relative positioning information that describes a position of hauling vehicle 10 relative to harvesting vehicle 20 from harvesting vehicle 20. In various embodiments, sensor(s) 140 are physically located with hauling vehicle 10. For example, sensor(s) 140 may include a chassis mounted infra-red sensor configured to measure crop health. Additionally or alternatively, sensor(s) 140 may be located separately of hauling vehicle 10. For example, sensor(s) 140 may include a nitrogen sensor configured to measure soil nitrogen remotely of hauling vehicle 10. Sensor(s) 140 may include hardware and/or software components. For example, sensor(s) 140 may include a GPS receiver configured to receive positional data and a software component configured to determine positional parameters associated with hauling vehicle 10 (e.g., pose, speed, yaw, trajectory, etc.) based on the positional data. As another example, sensor(s) 140 may include an optical device (e.g., a camera, LIDAR sensor, etc.) configured to capture image data and a software component configured to classify obstacles based on the image data.

Communication system 150 may facilitate communication between hauling vehicle 10 and/or vehicle control system 110 and external systems (e.g., harvesting vehicle 20, etc.). Communication system 150 may be or include wired or wireless communications interfaces (e.g., jacks, antennas, transmitters, receivers, transceivers, wire terminals, etc.) for conducting data communications within control environment 100 and/or with other external systems or devices. In various embodiments, communication via communication system 150 is direct (e.g., local wired or wireless communications). Additionally or alternatively, communication via communication system 150 may utilize a network (e.g., a WAN, the Internet, a cellular network, a vehicle-to-vehicle network, etc.). For example, vehicle control system 110 may communicate with a decision support system (DSS) using a 4G and/or 5G connection (e.g., via a 4G or 5G access point/small cell base station, etc.) and may communicate with harvesting vehicle 20 using a dedicated short-range communication channel (e.g., a vehicular ad-hoc network, etc.). In some embodiments, communication system 150 facilitates vehicle-to-vehicle (V2V) and/or vehicle-to-everything (V2X) communication. For example, communication system 150 may facilitate communication between hauling vehicle 10 and harvesting vehicle 20 using the IEEE 802.11p standard (e.g., a wireless access in vehicular environments (WAVE) vehicular communication system), using the cellular vehicle-to-everything (C-V2X) standard, the dedicated short range communication (DSRC) standard, and/or the like. In some embodiments, hauling vehicle 10 communicates with harvesting vehicle 20 via Wi-Fi.

Referring now generally to vehicle control system 110, vehicle control system 110 offers many benefits over existing systems. Conventional vehicle control systems typically require a user to fine-tune a fill position relative to an unloading vehicle such as a combine harvester. For example, a conventional vehicle control system may semi-autonomously or autonomously position a receiving container (e.g., a grain cart, etc.) to a generic position relative to an unloading auger and may require a user to manually fine-tune the position of the receiving container relative to the unloading auger to ensure a proper fill of the receiving container. However, because the conventional vehicle control system may position the receiving container to a generic position relative to the unloading auger, the unloading process may overfill the receiving container and cause spillage (e.g., because the operator forgets to fine-tune the positioning, because the receiving container is already full at the specific point, etc.). Moreover, the task of fine-tuning the fill position may be distracting to the user, increase user fatigue, and/or cause accidents (e.g., vehicle collisions as a result of a distracted driver, etc.). However, vehicle control system 110 described herein facilitates returning to a previous fill position, thereby reducing and/or eliminating a need for user input. For example, vehicle control system 110 may facilitate automatically (e.g., with little to no user input, etc.) positioning a receiving container in the same position relative to an unloading auger that was used in a previous unloading process, thereby reducing and/or eliminating the need for user fine-tuning. Additionally or alternatively, vehicle control system 110 may operate a vehicle such as a hauling vehicle to dynamically position a receiving container such as a grain cart relative to an unloading auger to ensure an even fill of the grain cart throughout an unloading process while tracking beside a harvesting vehicle in operation. In some embodiments, a user may fine-tune a position of a receiving container once and then vehicle control system 110 may store the updated position and use the updated position to perform future positioning of the receiving container.

Vehicle control system 110 may offer many benefits over existing positioning systems. Conventional positioning systems may use sensors such as cameras, time of flight (ToF) sensors, LIDAR, and/or the like to position a receiving container relative to an unloading auger (or other point of reference). For example, a conventional positioning system may use cameras to observe fill characteristics of a grain cart during an unloading process and adjust a position of the grain cart based on the fill characteristics. However, an agricultural process such as harvesting or unloading may introduce a significant amount of particulate into the air (e.g., corn dust, soybean dust, etc.), thereby reducing or eliminating the ability of sensors such as cameras, ToF sensors, and/or LIDAR to accurately position a receiving container. However, vehicle control system 110 described herein may facilitate positioning a receiving container in a manner that is not affected (or not significantly affected) by particulate, thereby improving an ability to accurately position a receiving container for an unloading process while avoiding spillage. For example, vehicle control system 110 may record a fill position (e.g., a fill position over time, etc.) of an unloading auger relative to a receiving container such as a grain cart, may calculate fill characteristics based on the recorded fill position information and/or supplemental information (e.g., a fill rate, a grain cart volume, a grain cart volume distribution, etc.), and may adjust operation of a vehicle to facilitate autonomously filling the grain cart while avoiding spillage (e.g., by operating a hauling vehicle towing the grain cart, etc.). That is, vehicle control system 110 may position a receiving container for an unloading process in a manner that is robust against a heavy ambient particulate level that may otherwise hamper conventional positioning systems.

Referring still to FIG. 1, vehicle control system 110 is shown to include processing circuit 160 having processor 162, memory 164, and positioning database 166. In some embodiments, vehicle control system 110 includes one or more processing circuits 160 including one or more processors 162 and one or more memories 164. Each of processors 162 can be a general purpose or specific purpose processor, an application specific integrated circuit (ASIC), one or more field programmable gate arrays (FPGAs), a group of processing components, or other suitable processing components. Each of processors 162 is configured to execute computer code or instructions stored in memory 164 or received from other computer readable media (e.g., CDROM, network storage, a remote server, etc.).

Memory 164 may include one or more devices (e.g., memory units, memory devices, storage devices, or other computer-readable media) for storing data and/or computer code for completing and/or facilitating the various processes described in the present disclosure. Memory 164 may include random access memory (RAM), read-only memory (ROM), hard drive storage, temporary storage, non-volatile memory, flash memory, optical memory, or any other suitable memory for storing software objects and/or computer instructions. Memory 164 may include database components, object code components, script components, or any other type of information structure for supporting the various activities and information structures described in the present disclosure. Memory 164 may be communicably connected to processor(s) 162 via processing circuit 160 and may include computer code for executing (e.g., by processor 162) one or more of the processes described herein.

Memory 164 is shown to include position measurement circuit 170, fill estimation circuit 172, position sharing circuit 176, and controller circuit 178. Position measurement circuit 170 may measure a position. In various embodiments, the position is associated with a fill position. For example, position measurement circuit 170 may measure a position of a grain cart relative to an unloading auger of a harvesting vehicle. As another example, position measurement circuit may measure a position of a hauling vehicle towing a grain cart relative to a harvesting vehicle when the harvesting vehicle completes an unloading process. In some embodiments, the position is a relative position. For example, position measurement circuit 170 may measure a position of a grain cart relative to an arbitrary point (e.g., a preset, etc.) such as a generic fill point (e.g., where the generic fill point is relative to the body of a harvesting vehicle, etc.). In some embodiments, the position is an absolute position. For example, position measurement circuit 170 may measure a latitude and/or longitude of a grain cart. In various embodiments, the position is a combination of a relative position and an absolute position. For example, position measurement circuit 170 may measure a latitude and/or longitude offset associated with a position of a grain cart relative to a harvesting vehicle. It should be understood that measurements may be expressed in any coordinate system (e.g., Polar, Cartesian, etc.) and/or with respect to any point (e.g., with respect to a point on harvesting vehicle 20, with respect to a beacon, etc.).

In various embodiments, position measurement circuit 170 may measure a last used fill position associated with an unloading process. For example, a user and/or vehicle control system 110 may position a grain cart to receive grain from an unloading auger of a harvesting vehicle and position measurement circuit 170 may record the last fill position of the unloading process (e.g., once the harvesting vehicle ceased unloading grain into the grain cart, etc.). In various embodiments, position measurement circuit 170 determines a position using information from sensor(s) 140. For example, position measurement circuit 170 may receive GPS coordinates from a GPS receiver. As another example, position measurement circuit 170 may receive distance measurements associated with a relative positioning of a grain cart to a harvesting vehicle from a LIDAR sensor. In various embodiments, position measurement circuit 170 stores position measurements in positioning database 166.

Fill estimation circuit 172 may determine fill characteristics associated with a receiving container. In various embodiments, fill estimation circuit 172 may determine a fill distribution of a receiving container such as a grain cart. For example, fill estimation circuit 172 may use a fill position (e.g., timeseries data, etc.), an unloading flow rate (e.g., of an unloading auger in bushels/sec, etc.), and/or container volume distribution characteristics to determine a fill distribution associated with a grain cart. In various embodiments, fill estimation circuit 172 receives fill position information from position measurement circuit 170 and/or positioning database 166. For example, fill estimation circuit 172 may receive timeseries fill position information describing a position of an unloading auger relative to a grain cart throughout an unloading process associated with the grain cart. In some embodiments, fill estimation circuit 172 generates one or more user interfaces to visualize a fill distribution of a receiving container. For example, fill estimation circuit 172 may generate a heat map associated with a grain cart illustrating a relative fill (e.g., a fill height, a percentage of full, etc.) for various points associated with the grain cart. In various embodiments, the fill characteristics generated by fill estimation circuit 172 may be used by other systems (e.g., unload positioning circuit 174, external systems, etc.). For example, unload positioning circuit 174 may use the fill characteristics to determine a position (e.g., a position that is not yet full or close to being full, etc.) to begin filling a receiving container such as a grain cart or semi-trailer. As another example, unload positioning circuit 174 may use the fill characteristics to position an unloading auger relative to a receiving container such as a grain cart throughout an unloading process (e.g., by moving the position of the unloading auger relative to the grain cart when the fill characteristics indicate that a current portion of the grain cart is nearly full, etc.). As yet another example, controller circuit 178 may use the fill characteristics to automatically shut off flow from an unloading auger in response to determining a receiver container (e.g., a grain bin, a grain cart, etc.) is full.

Unload positioning circuit 174 may position a receiving container for an unloading process. In various embodiments, positioning the receiving container includes operating a vehicle. For example, unload positioning circuit 174 may operate a hauling vehicle to position an unloading auger in a specific position relative to a grain cart the hauling vehicle is towing. As another example, unload positioning circuit 174 may operate a combine harvester to position an unloading auger in a specific position relative to a hauling vehicle that is tracking beside the combine harvester. In various embodiments, unload positioning circuit 174 receives information from position measurement circuit 170, fill estimation circuit 172, position sharing circuit 176, and/or positioning database 166. For example, unload positioning circuit 174 may receive a last used fill position associated with a most recent unloading process associated with a particular combine harvester and hauling vehicle and may position the hauling vehicle relative to the combine harvester such that a subsequent unloading process begins where the most recent unloading process left off. In various embodiments, unload positioning circuit 174 dynamic operates one or more vehicles. For example, unload positioning circuit 174 may dynamically control a position of a hauling vehicle during an unloading process to ensure that a grain cart towed by the hauling vehicle receives an even fill while the haul vehicle tracks beside a harvesting vehicle in operation. In various embodiments, unload positioning circuit 174 accounts for vehicle variations. For example, unload positioning circuit 174 may position a hauling vehicle relative to a second harvesting vehicle such that an unloading process associated with the second harvesting vehicle beings in the same place as a previous unloading process left off (e.g., the same fill point, a position of an unloading auger relative to a grain cart, etc.) while accounting for a different length of unloading auger between the first harvesting vehicle and the second harvesting vehicle. It should be understood that unloading positioning circuit 174 may account for any vehicle variation such as difference in grain cart dimensions, difference in vehicle heights, difference in receiving container volume distributions, difference in unloading flow rate, difference in unloading auger length, difference, in towing distance behind a hauling vehicle (e.g., the distance behind a hauling vehicle that a grain cart is, etc.), and/or the like. It should also be understood that unload positioning circuit 174 may account for any difference in environment such as difference in slope, difference in elevation, relative difference in ground compaction, and/or the like.

Position sharing circuit 176 may share position information with external systems. For example, position sharing circuit 176 may share a last used fill position (e.g., a position of an unloading auger relative to a grain cart, etc.) with another vehicle such as a combine harvester. In some embodiments, position sharing circuit 176 shares absolute position information such as GPS coordinates. Additionally or alternatively, position sharing circuit 176 may share relative position information such as a position of a hauling vehicle relative to a combine harvester or a position of an unloading auger relative to a grain cart. In various embodiments, position sharing circuit 176 shares position information wirelessly. For example, position sharing circuit 176 may share position information via the IEEE 802.11p standard as described above with reference to communication system 150. In various embodiments, position sharing circuit 176 shares position information between vehicles. For example, a hauling vehicle may perform a first unloading process with a first harvesting vehicle and then may transfer over to a second harvesting vehicle and position sharing circuit 176 may share a last fill position of the first unloading process with the second harvesting vehicle such that a second unloading process with the second harvesting vehicle begins where the first unloading process left off.

Controller circuit 178 may facilitate control of hauling vehicle 10. For example, controller circuit 178 may receive positioning information from unload positioning circuit 174 and generate control signals for primary mover 130 to operate hauling vehicle 10. In some embodiments, controller circuit 178 may facilitate autonomous and/or semi-autonomous operation of hauling vehicle 10. Additionally or alternatively, controller circuit 178 may receive information from external sources and operate hauling vehicle 10 based on the received information. For example, controller circuit 178 may receive a route from an external controller (e.g., a cloud-based control system, etc.) and operate hauling vehicle 10 based on the received route.

Positioning database 166 may store position data. In various embodiments, the position data includes information describing a fill position associated with an unloading process. For example, positioning database 166 may store timeseries data describing a position of an unloading auger relative to a grain cart during an unloading process (e.g., a position for every 5 seconds of the unloading process, etc.). The position data may be or include Cartesian information (e.g., a map of a space such as a farm field, relative distances between a number of vehicles, etc.). In various embodiments, positioning database 166 receives and stores position data from position measurement circuit 170. In various embodiments, positioning database 166 provides position data to unload positioning circuit 174. For example, positioning database 166 may provide position data associated with a last used fill position to unload positioning circuit 174 so that unload positioning circuit 174 may position a hauling vehicle such that an unloading process begins unloading grain into the last used fill position.

Harvesting vehicle 20 is shown to include sensor(s) 22, positioning system 24, and communication system 26. Sensor(s) 22 may be similar to sensor(s) 140. For example, sensor(s) 22 may include a geolocation sensor (e.g., a GPS receiver, satellite navigation transceiver, etc.) configured to monitor a position of harvesting vehicle 20 (e.g., provide geolocation and/or time information, etc.). Positioning system 24 may be similar to unload positioning circuit 174. For example, positioning system 24 may position harvesting vehicle 20 relative to hauling vehicle 10 such that an unloading process begins where a previous unloading process left off.

Communication system 26 may be similar to communication system 150. For example, communication system 26 may facilitate communication between harvesting vehicle 20 and external systems (e.g., hauling vehicle 10, etc.). Communication system 26 may be or include wired or wireless communications interfaces (e.g., jacks, antennas, transmitters, receivers, transceivers, wire terminals, etc.) for conducting data communications within control environment 100 and/or with other external systems or devices.

Figure 2:
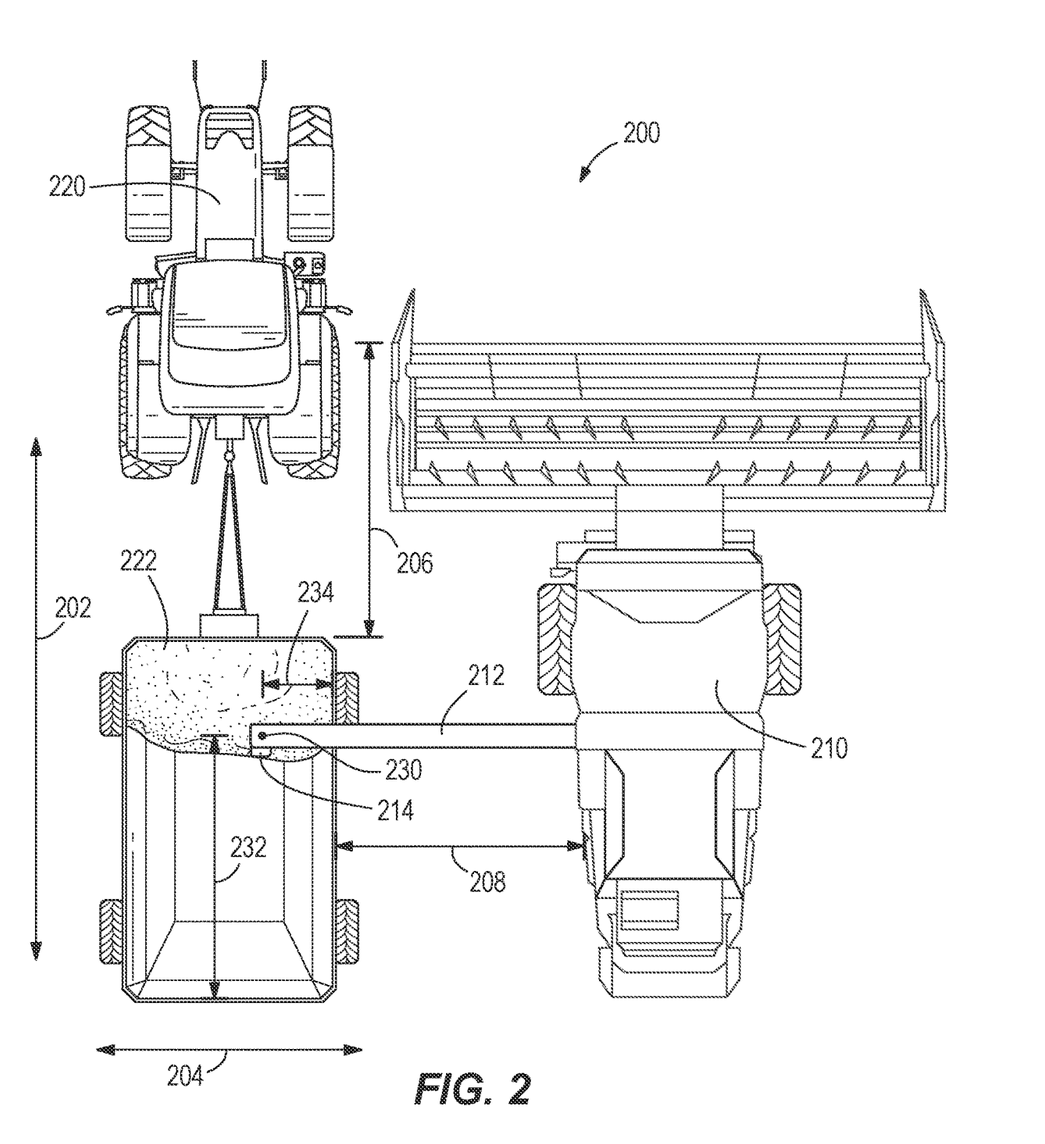
FIG. 2 is a diagram illustrating positioning a vehicle, according to an exemplary embodiment.

Referring now to FIG. 2, a diagram illustrating environment 200 for positioning a vehicle is shown, according to an exemplary embodiment. In various embodiments, environment 200 includes harvesting vehicle 210 which unloads a harvested crop into grain cart 222 towed by hauling vehicle 220 using unloading auger 212. In various embodiments, vehicle control system 110 operates at least one of harvesting vehicle 210, hauling vehicle 220, or grain cart 222 to perform an unloading process while preventing spillage. In various embodiments, vehicle control system 110 operates at least one of harvesting vehicle 210, hauling vehicle 220, or grain cart 222 semi-autonomously or autonomously (e.g., with little to no user input, etc.). In various embodiments, vehicle control system 110 positions grain cart 222 such that an unloading process begins where a previous unloading process left off (e.g., in the same fill position, etc.).

It should be understood that while FIG. 2 is described such that harvesting vehicle 210 is stationary and hauling vehicle 220 and/or grain cart 222 move relative to harvesting vehicle 210, any component of environment 200 may move relative to any other component (or arbitrary point) and movement and/or relative and/or absolute positions may be described using any coordinate system with reference to any reference point. For example, harvesting vehicle 210 may be moving during operation and a position of hauling vehicle 220 may be described in reference to a changing position and/or orientation of harvesting vehicle 210 using Spherical coordinates.

Hauling vehicle 220 and/or grain cart 222 may be positioned in vertical space 202 and/or horizontal space 204. In various embodiments, a position of hauling vehicle 220 and/or grain cart 222 may be described in relation to harvesting vehicle 210. For example, grain cart 222 may have relative horizontal distance 208 from harvesting vehicle 210 and hauling vehicle 220 may have relative vertical distance 206 from harvesting vehicle 210. In some embodiments, hauling vehicle 220 and grain cart 222 are treated as a single entity. Additionally or alternatively, hauling vehicle 220 and grain cart 222 may be described separately (e.g., independent position descriptions, etc.). In various embodiments, a position of one or more of the entities in environment 200 (e.g., harvesting vehicle 210, hauling vehicle 220, and/or grain cart 222, etc.) may be determined using sensor(s) 140. For example, a position of harvesting vehicle 210 may be described using GPS coordinates. As another example, a position of hauling vehicle 220 may be described used a GPS offset from a position of harvesting vehicle 210. As yet another example, a position of grain cart 222 may be described using a relative distance (e.g., as measured by a ToF sensor, LIDAR, etc.) from one or more points on harvesting vehicle 210. It should be understood that any point may serve as a reference point for relative distance measurements. For example, a position of grain cart 222 may be described as a series of vectors emanating from a center of mass of grain cart 222 and ending at arbitrary points on harvesting vehicle 210. As another example, a position of grain cart 222 may be described as a series of vectors between various sensors deployed on grain cart 222 and/or harvesting vehicle 210.

In various embodiments, vehicle control system 110 determines a fill position associated with an unloading process (e.g., a process of transferring a harvested crop from harvesting vehicle 210 to a receiving container, etc.). For example, vehicle control system 110 may determine a relative position between unloading point 230 associated with chute 214 of unloading auger 212 and the dimensions of grain cart 222. In various embodiments, vehicle control system 110 may determine relative vertical position 232 and/or relative horizontal position 234 in relation to unloading point 230 for an unloading process. Vehicle control system 110 may store relative vertical position 232 and/or relative horizontal position 234 and use vertical position 232 and/or relative horizontal position 234 to position grain cart 222 in the future (e.g., to achieve the same position, etc.). In various embodiments, vehicle control system 110 uses vertical position 232 and/or relative horizontal position 234 to determine fill characteristics associated with grain cart 222 as described above in reference to fill estimation circuit 172.

Figure 3:
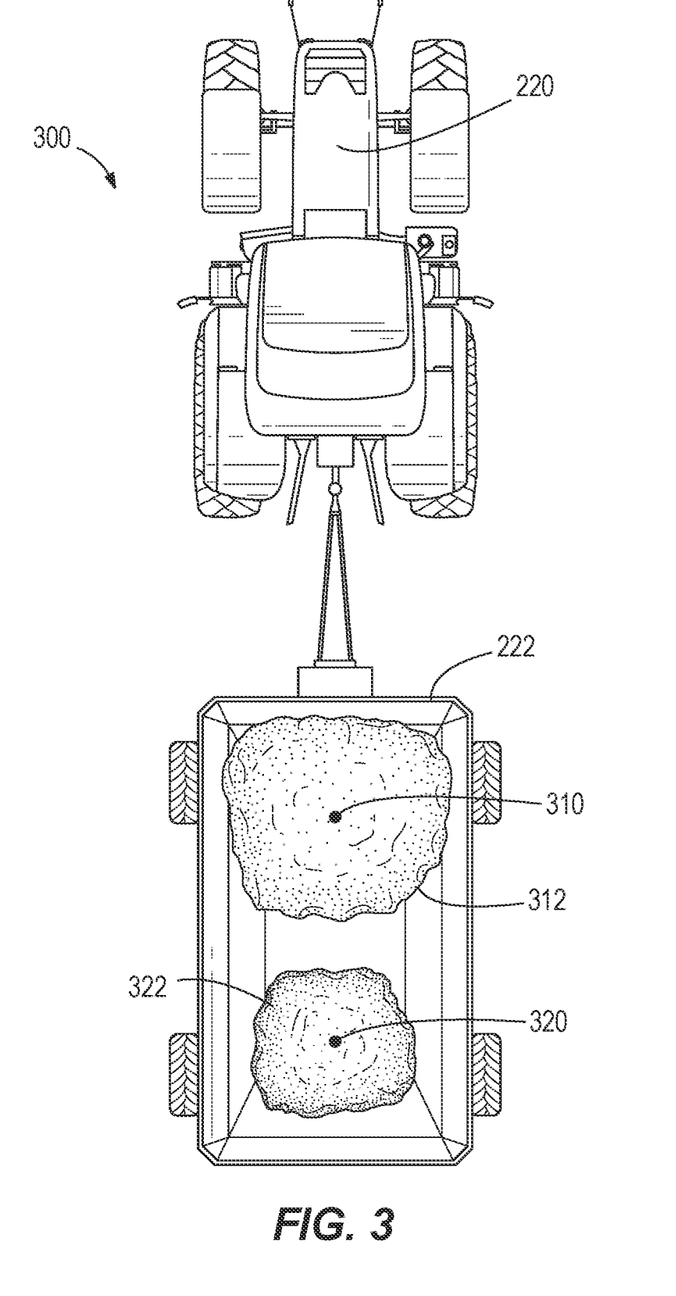
FIG. 3 is a diagram illustrating determining fill characteristics, according to an exemplary embodiment.

Referring now to FIG. 3, environment 300 for determining fill characteristics is shown, according to an exemplary embodiment. In various embodiments, vehicle control system 110 may determine fill characteristics such as a fill distribution associated with grain cart 222. Additionally or alternatively, vehicle control system 110 may use fill characteristics to position grain cart 222 for an unloading process. For example, vehicle control system 110 may determine a portion of grain cart 222 is already full and may position grain cart 222 such that an unloading process begins in a portion of grain cart 222 that is not yet full. In various embodiments, vehicle control system 110 determines fill characteristics using at least one of fill position information (e.g., a last used fill position, timeseries fill position information, etc.), unloading flow rate information (e.g., timeseries unloading flow rate information, etc.), crop information (e.g., how much volume a given weight of crop occupies, crop moisture content, etc.), receiving container volume distribution information (e.g., how much volume for receiving crop exists at various points within grain cart 222, etc.), and/or the like. For example, vehicle control system 110 may determine that a flow rate of 80 L/s may fill a first portion of grain cart 222 to 70% capacity and a second portion of grain cart 222 to 15% (e.g., because of natural distribution effects, etc.) in 25 seconds. In various embodiments, vehicle control system 110 may model a fill distribution of grain cart 222 as a 2-dimensional histogram. For example, vehicle control system 110 may generate an estimated fill (e.g., a percentage of full capacity, a fill height, etc.) for a plurality of points on a 2-dimensional plane that is associated with floor dimensions of grain cart 222. In some embodiments, vehicle control system 110 generates a confidence interval associated with fill characteristics.

In various embodiments, vehicle control system 110 may determine a fill amount associated with crop deposited into grain cart 222 during an unloading process. For example, vehicle control system 110 may determine that a first unloading process associated with first point 310 produced first fill amount 312 and a second unloading process associated with second point 320 produced second fill amount 322. In various embodiments, vehicle control system 110 may position grain cart 222 during an unloading process based on first fill amount 312 and/or second fill amount 322. For example, first fill amount 312 may indicate that first point 310 is full (e.g., additional crop in this area will create spillage, etc.) and vehicle control system 110 may position grain cart 222 such that an unloading process unloads into second point 320 which can accommodate additional crop without causing spillage. In various embodiments, vehicle control system 110 may determine a change in fill characteristics based on an unloading process. In various embodiments, vehicle control system 110 may determine a change in fill characteristics associated with giving up grain (e.g., unloading grain from grain cart 222 into a semi-truck, etc.). In various embodiments, vehicle control system 110 may track a fill amount associated with a container over time. For example, grain cart 222 may receive grain during a first unloading process, may receive additional grain during a second unloading process, may give up grain during a third unloading process, and vehicle control system 110 may determine a current fill amount such that grain cart 222 can be accurately positioned for a fourth unloading process to receive grain without causing spillage.

Figure 4:
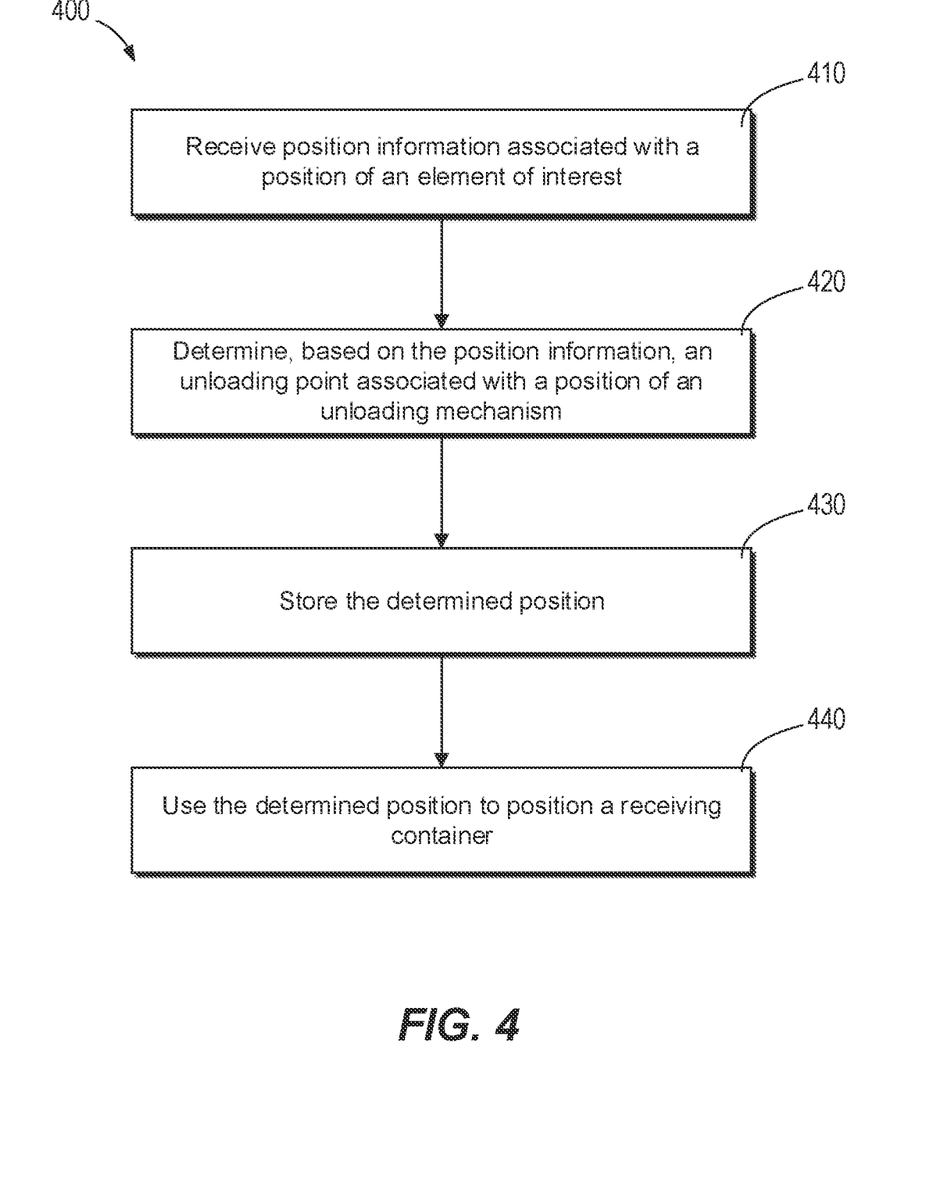
FIG. 4 is a flow diagram of a method of determining a fill position, according to an exemplary embodiment.

Referring now to FIG. 4, method 400 for determining a fill position is shown, according to an exemplary embodiment. In various embodiments, vehicle control system 110 performs method 400. At step 410, vehicle control system 110 receives position information associated with a position of an element of interest. In various embodiments, the element of interest is associated with a vehicle and/or a vehicular implement. For example, the position information may be associated with a harvesting vehicle, a hauling vehicle, a grain cart, an arbitrary point, and/or the like. In some embodiments, the position information is received from external sources. Additionally or alternatively, the position information may be generated by hauling vehicle 10. For example, step 410 may include measuring a fill position associated with a current unloading operation using a GPS receiver to express the fill position as a relative offset of a grain cart position from a harvesting vehicle position. At step 420, vehicle control system 110 determines an unloading point associated with a position of an unloading mechanism. In various embodiments, the unloading point is determined based on the position information received in step 410. In various embodiments, the unloading point is associated with a previous unloading point. For example, the unloading point may be a fill position associated with a previous unloading process. In some embodiments, the unloading point includes a position of the unloading mechanism (e.g., an unloading auger, etc.) relative to a receiving container (e.g., a grain cart, etc.). In some embodiments, the unloading point is determined using fill characteristics associated with a receiving container.

At step 430, vehicle control system 110 stores the determined position. In various embodiments, step 430 may include storing the determined position in positioning database 166. At step 440, vehicle control system 110 may use the determined position to position a receiving container. For example, vehicle control system 110 may position a grain cart to achieve a last used fill position. As another example, vehicle control system 110 may generate control signals to cause operation of primary mover 130. Additionally or alternatively, vehicle control system 110 may display information to a user. For example, vehicle control system 110 may display a heat map illustrating a fill distribution of a grain cart to a user. Additionally or alternatively, vehicle control system 110 may send the determined position to other systems. For example, vehicle control system 110 may send the determined position to communication system 150 for transmittal to an external decision support system (DSS).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. A vehicle control system for an agricultural vehicle, the vehicle control system comprising:
   a processing circuit including a processor and memory, the memory having instructions stored thereon that, when executed by the processor, cause the processing circuit to:
     receive position information associated with a position of at least one of a second agricultural vehicle or a vehicular implement from a geolocation sensor;
     determine, based on the position information from the geolocation sensor, a first fill position, wherein the first fill position includes a first unloading point associated with a position of an unloading mechanism relative to a receiving container;
     operate at least one of the agricultural vehicle or the second agricultural vehicle to position the receiving container such that a first subsequent unloading point is the same as the determined first unloading point;
     identify a first fill point associated with the first fill position is full;
     in response to identifying that the first fill point is full, determining a second fill position of the receiving container, wherein the second fill position includes a second unloading point;
     operate the at least one of the agricultural vehicle or the second agricultural vehicle to position the receiving container such that a second subsequent unloading point is the same as the determined second unloading point;

store the determined second fill position used to operate the at least one of the agricultural vehicle or the second agricultural vehicle; and resume, after stopping operation of the at least one agricultural vehicle or the second agricultural vehicle, operating the at least one of the agricultural vehicle or the second agricultural vehicle based on the stored determined second fill position.

2. The vehicle control system of claim 1, wherein the position information includes global positioning system (GPS) data.

3. The vehicle control system of claim 1, wherein the position information includes relative position information describing a position of at least one of the second agricultural vehicle or the vehicular implement relative to the agricultural vehicle.

4. The vehicle control system of claim 1, wherein the processing circuit is further configured to share the determined first fill position with an external system.

5. The vehicle control system of claim 1, wherein operating at least one of the agricultural vehicle or the second agricultural vehicle includes positioning a grain cart relative to the unloading mechanism autonomously without user input.

6. The vehicle control system of claim 1, wherein the determined first fill position is used to calculate a fill characteristic of the receiving container.

7. The vehicle control system of claim 1, wherein the vehicular implement includes a grain cart.

8. A method of positioning a receiving container, comprising:

receiving, by a processor, position information associated with a position of at least one of a second agricultural vehicle or a vehicular implement from a geolocation sensor;

determining, by the processor, based on the position information from the geolocation sensor, a first fill position, wherein the first fill position includes a first unloading point associated with a position of an unloading mechanism relative to a receiving container;

operating, by the processor, at least one of a first agricultural vehicle or the second agricultural vehicle to position the receiving container such that a first subsequent unloading point is the same as the determined first unloading point;

identifying, by the processor, a first fill point associated with the first fill point is full;

in response to identifying that the first fill point is full, determining, by the processor, a second fill position of the receiving container, wherein the second fill position includes a second unloading point;

operating, by the processor, the at least one of the agricultural vehicle or the second agricultural vehicle to position the receiving container such that a second subsequent unloading point is the same as the determined second unloading point;

storing, by the processor, the determined second fill position used to operate the at least one of the agricultural vehicle or the second agricultural vehicle; and resuming, by the processor, after stopping operation of the at least one agricultural vehicle or the second agricultural vehicle, operating the at least one of the agricultural vehicle or the second agricultural vehicle based on the stored determined second fill position.

9. The method of claim 8, wherein the position information includes global positioning system (GPS) data.

10. The method of claim 8, wherein the position information includes relative position information describing a position of at least one of the second agricultural vehicle or the vehicular implement relative to the first agricultural vehicle.

11. The method of claim 8, further comprising sharing, by the processor, the determined first fill position with an external system.

12. The method of claim 8, wherein operating at least one of the agricultural vehicle or the second agricultural vehicle includes positioning a grain cart relative to the unloading mechanism autonomously without user input.

13. The method of claim 8, wherein the determined first fill position is used to calculate a fill characteristic of the receiving container.

14. The method of claim 8, wherein the vehicular implement includes a grain cart.

15. A non-transitory computer-readable storage medium having instructions stored thereon that, when executed by a processor, cause the processor to:

receive position information associated with a position of at least one of a second agricultural vehicle or a vehicular implement from a geolocation sensor;

determine, based on the position information from the geolocation sensor, a first fill position, wherein the first fill position includes a first unloading point associated with a position of an unloading mechanism relative to a receiving container;

operate at least one of a first agricultural vehicle or the second agricultural vehicle to position the receiving container such that a first subsequent unloading point is the same as the determined first unloading point;

identify a first fill point associated with the first fill position is full;

in response to identifying that the first fill point is full, determining a second fill position of the receiving container, wherein the second fill position includes a second unloading point;

operate the at least one of the agricultural vehicle or the second agricultural vehicle to position the receiving container such that a second subsequent unloading point is the same as the determined second unloading point;

store the determined second fill position used to operate the at least one of the agricultural vehicle or the second agricultural vehicle; and resume, after stopping operation of the at least one agricultural vehicle or the second agricultural vehicle, operating the at least one of the agricultural vehicle or the second agricultural vehicle based on the stored determined second fill position.

16. The non-transitory computer-readable storage medium of claim 15, wherein the position information includes global positioning system (GPS) data.

17. The non-transitory computer-readable storage medium of claim 15, wherein the position information includes relative position information describing a position of at least one of the second agricultural vehicle or the vehicular implement relative to the first agricultural vehicle.

18. The non-transitory computer-readable storage medium of claim 15, wherein the processor is further configured to share the determined first fill position with an external system.

19. The non-transitory computer-readable storage medium of claim 15, wherein the determined first fill position is used to calculate a fill characteristic of the receiving container.

20. The non-transitory computer-readable storage medium of claim 15, wherein the vehicular implement includes a grain cart.

* * * * *